(12) United States Patent
Gurman et al.

(10) Patent No.: US 8,565,479 B2
(45) Date of Patent: Oct. 22, 2013

(54) EXTRACTION OF SKELETONS FROM 3D MAPS

(75) Inventors: Amiad Gurman, D.N. Efrayim (IL); Tomer Yanir, Rinatya (IL); Erez Sali, Savion (IL)

(73) Assignee: Primesense Ltd., Tel Aviv (IL)

( * ) Notice: Subject to any disclaimer, the term of this patent is extended or adjusted under 35 U.S.C. 154(b) by 466 days.

(21) Appl. No.: 12/854,188

(22) Filed: Aug. 11, 2010

(65) Prior Publication Data

US 2011/0052006 A1 Mar. 3, 2011

Related U.S. Application Data

(60) Provisional application No. 61/233,502, filed on Aug. 13, 2009.

(51) Int. Cl.
*G06K 9/00* (2006.01)

(52) U.S. Cl.
USPC .......................................... 382/103; 382/154

(58) Field of Classification Search
USPC ................................................ 382/103, 154
See application file for complete search history.

(56) References Cited

U.S. PATENT DOCUMENTS

| | | | |
|---|---|---|---|
| 5,684,887 A | 11/1997 | Lee et al. | |
| 5,846,134 A | 12/1998 | Latypov | |
| 5,852,672 A | 12/1998 | Lu | |
| 5,862,256 A | 1/1999 | Zetts et al. | |
| 5,864,635 A | 1/1999 | Zetts et al. | |
| 5,870,196 A | 2/1999 | Lulli et al. | |
| 6,002,808 A | 12/1999 | Freeman | |
| 6,176,782 B1 * | 1/2001 | Lyons et al. | 463/36 |
| 6,256,033 B1 | 7/2001 | Nguyen | |
| 6,658,136 B1 | 12/2003 | Brumitt | |
| 6,681,031 B2 | 1/2004 | Cohen et al. | |
| 6,857,746 B2 | 2/2005 | Dyner | |
| 7,003,134 B1 | 2/2006 | Covell et al. | |
| 7,003,136 B1 | 2/2006 | Harville | |
| 7,013,046 B2 | 3/2006 | Kawamura et al. | |
| 7,042,440 B2 | 5/2006 | Pryor et al. | |
| 7,170,492 B2 | 1/2007 | Bell | |
| 7,203,356 B2 * | 4/2007 | Gokturk et al. | 382/154 |
| 7,215,815 B2 | 5/2007 | Honda | |

(Continued)

FOREIGN PATENT DOCUMENTS

| | | | |
|---|---|---|---|
| JP | H03-029806 A | 2/1991 | |
| JP | H10-235584 A | 9/1998 | |

(Continued)

OTHER PUBLICATIONS

Hart, D., U.S. Appl. No. 09/616,606, filed Jul. 14, 2000.

(Continued)

*Primary Examiner* — Tom Y Lu

(74) *Attorney, Agent, or Firm* — D. Kligler I.P. Services Ltd.

(57) ABSTRACT

A method for processing data includes receiving a temporal sequence of depth maps of a scene containing a humanoid form having a head. The depth maps include a matrix of pixels having respective pixel depth values. A digital processor processes at least one of the depth maps so as to find a location of the head and estimates dimensions of the humanoid form based on the location. The processor tracks movements of the humanoid form over the sequence using the estimated dimensions.

27 Claims, 3 Drawing Sheets

(56) References Cited

U.S. PATENT DOCUMENTS

| | | |
|---|---|---|
| 7,259,747 B2 | 8/2007 | Bell |
| 7,302,099 B2 | 11/2007 | Zhang et al. |
| 7,340,077 B2 | 3/2008 | Gokturk |
| 7,348,963 B2 | 3/2008 | Bell |
| 7,428,542 B1 | 9/2008 | Fink et al. |
| 7,536,032 B2 | 5/2009 | Bell |
| 7,555,158 B2 | 6/2009 | Park et al. |
| 7,580,572 B2 | 8/2009 | Bang et al. |
| 7,583,275 B2 | 9/2009 | Neumann et al. |
| 7,925,077 B2 | 4/2011 | Woodfill et al. |
| 8,280,106 B2 | 10/2012 | Ma |
| 8,379,926 B2 | 2/2013 | Kanhere et al. |
| 8,411,149 B2 | 4/2013 | Maison et al. |
| 8,411,932 B2 | 4/2013 | Liu et al. |
| 2002/0071607 A1 | 6/2002 | Kawamura et al. |
| 2003/0095698 A1 | 5/2003 | Kawano |
| 2003/0156756 A1 | 8/2003 | Gokturk et al. |
| 2003/0235341 A1 | 12/2003 | Gokturk et al. |
| 2004/0091153 A1 | 5/2004 | Nakano et al. |
| 2004/0183775 A1 | 9/2004 | Bell |
| 2004/0184640 A1 | 9/2004 | Bang et al. |
| 2004/0184659 A1 | 9/2004 | Bang et al. |
| 2004/0258306 A1 | 12/2004 | Hashimoto |
| 2005/0031166 A1* | 2/2005 | Fujimura et al. .............. 382/103 |
| 2005/0088407 A1 | 4/2005 | Bell et al. |
| 2005/0089194 A1 | 4/2005 | Bell |
| 2005/0265583 A1 | 12/2005 | Covell et al. |
| 2005/0271279 A1 | 12/2005 | Fujimura et al. |
| 2006/0092138 A1 | 5/2006 | Kim et al. |
| 2006/0115155 A1 | 6/2006 | Lui et al. |
| 2006/0159344 A1 | 7/2006 | Shao et al. |
| 2007/0076016 A1 | 4/2007 | Agarwala et al. |
| 2007/0154116 A1 | 7/2007 | Shieh |
| 2007/0230789 A1 | 10/2007 | Chang et al. |
| 2008/0123940 A1 | 5/2008 | Kundu et al. |
| 2008/0226172 A1 | 9/2008 | Connell |
| 2008/0236902 A1 | 10/2008 | Imaizumi |
| 2008/0252596 A1 | 10/2008 | Bell et al. |
| 2008/0260250 A1 | 10/2008 | Vardi |
| 2008/0267458 A1 | 10/2008 | Laganiere et al. |
| 2009/0009593 A1 | 1/2009 | Cameron et al. |
| 2009/0027335 A1 | 1/2009 | Ye |
| 2009/0078473 A1 | 3/2009 | Overgard et al. |
| 2009/0083622 A1 | 3/2009 | Chien et al. |
| 2009/0096783 A1 | 4/2009 | Shpunt et al. |
| 2009/0116728 A1 | 5/2009 | Agrawal et al. |
| 2009/0183125 A1 | 7/2009 | Magal et al. |
| 2009/0297028 A1 | 12/2009 | De Haan |
| 2010/0002936 A1 | 1/2010 | Khomo |
| 2010/0007717 A1 | 1/2010 | Spektor et al. |
| 2010/0034457 A1 | 2/2010 | Berliner et al. |
| 2010/0111370 A1 | 5/2010 | Black et al. |
| 2010/0235786 A1 | 9/2010 | Maizels et al. |
| 2010/0302138 A1* | 12/2010 | Poot et al. ..................... 345/156 |
| 2010/0322516 A1 | 12/2010 | Xu et al. |
| 2011/0182477 A1 | 7/2011 | Tamrakar et al. |
| 2011/0211754 A1 | 9/2011 | Litvak et al. |
| 2011/0237324 A1* | 9/2011 | Clavin et al. ..................... 463/29 |
| 2011/0292036 A1 | 12/2011 | Sali et al. |
| 2011/0293137 A1 | 12/2011 | Gurman et al. |
| 2012/0070070 A1 | 3/2012 | Litvak |

FOREIGN PATENT DOCUMENTS

| | | |
|---|---|---|
| WO | 9935633 A2 | 7/1999 |
| WO | 03071410 A2 | 8/2003 |
| WO | 2004107272 A1 | 12/2004 |
| WO | 2005003948 A1 | 1/2005 |
| WO | 2005094958 A2 | 10/2005 |
| WO | 2007043036 A1 | 4/2007 |
| WO | 2007078639 A2 | 7/2007 |
| WO | 2007105205 A2 | 9/2007 |
| WO | 2007132451 A2 | 11/2007 |
| WO | 2007135376 A2 | 11/2007 |
| WO | 2008120217 A2 | 10/2008 |
| WO | 2010004542 A1 | 1/2010 |

OTHER PUBLICATIONS

International Application PCT/IL2007/000306 Search Report dated Oct. 2, 2008.

International Application PCT/IL2007/000306 Preliminary Report on Patentability dated Mar. 19, 2009.

International Application PCT/IL2006/000335 Preliminary Report on Patentability dated Apr. 24, 2008.

Avidan et al., "Trajectory triangulation: 3D reconstruction of moving points from amonocular image sequence", PAMI, vol. 22, No. 4, pp. 348-357, Apr. 2000.

Leclerc et al., "The direct computation of height from shading", IEEE Conference on Computer Vision and Pattern Recognition, pp. 552-558, Jun. 3-7, 1991.

Zhang et al., "Shape from intensity gradient", IEEE Transactions on Systems, Man, and Cybernetics—Part A: Systems and Humans, vol. 29, No. 3, pp. 318-325, May 1999.

Zhang et al., "Height recovery from intensity gradients", IEEE Conference on Computer Vision and Pattern Recognition, pp. 508-513, Jun. 20-24, 1994.

Horn, B., "Height and gradient from shading", International Journal of Computer Vision , vol. 5, No. 1, pp. 37-75, Aug. 1990.

Bruckstein, A., "On Shape from Shading", Computer Vision, Graphics, and Image Processing Journal, vol. 44, issue 2, pp. 139-154, Nov. 1988.

Zhang et al., "Rapid Shape Acquisition Using Color Structured Light and Multi-Pass Dynamic Programming", 1st International Symposium on 3D Data Processing Visualization and Transmission (3DPVT), Padova, Italy, Jun. 19-21, 2002.

Besl, P., "Active Optical Range Imaging Sensors", Journal Machine Vision and Applications, vol. 1, issue 2, pp. 127-152, Apr. 1988.

Horn et al., "Toward optimal structured light patterns", Proceedings of International Conference on Recent Advances in 3D Digital Imaging and Modeling, pp. 28-37, Ottawa, Canada, May 1997.

Goodman, J.W., "Statistical Properties of Laser Speckle Patterns", Laser Speckle and Related Phenomena, pp. 9-75, Springer-Verlag, Berlin Heidelberg, 1975.

Asada et al., "Determining Surface Orientation by Projecting a Stripe Pattern", IEEE Transactions on Pattern Analysis and Machine Intelligence, vol. 10, No. 5, pp. 749-754, Sep. 1988.

Winkelbach et al., "Shape from Single Stripe Pattern Illumination", Luc Van Gool (Editor), (DAGM 2002) Patter Recognition, Lecture Notes in Computer Science 2449, p. 240-247, Springer 2002.

Koninckx et al., "Efficient, Active 3D Acquisition, based on a Pattern-Specific Snake", Luc Van Gool (Editor), (DAGM 2002) Pattern Recognition, Lecture Notes in Computer Science 2449, pp. 557-565, Springer 2002.

Kimmel et al., Analyzing and synthesizing images by evolving curves with the Osher-Sethian method, International Journal of Computer Vision, vol. 24, issue 1, pp. 37-55, Aug. 1997.

Zigelman et al., "Texture mapping using surface flattening via multi-dimensional scaling", IEEE Transactions on Visualization and Computer Graphics, vol. 8, issue 2, pp. 198-207, Apr.-Jun. 2002.

Dainty, J.C., "Introduction", Laser Speckle and Related Phenomena, pp. 1-7, Springer-Verlag, Berlin Heidelberg, 1975.

Mendlovic, et al., "Composite harmonic filters for scale, projection and shift invariant pattern recognition", Applied Optics Journal, vol. 34, No. 2, pp. 310-316, Jan. 10, 1995.

Fua et al., "Human Shape and Motion Recovery Using Animation Models", 19th Congress, International Society for Photogrammetry and Remote Sensing, Amsterdam, The Netherlands, Jul. 2000.

Allard et al., "Marker-less Real Time 3D modeling for Virtual Reality", Immersive Projection Technology, Iowa State University, IPT 2004.

Howe et al., "Bayesian Reconstruction of 3D Human Motion from Single-Camera Video", Advances in Neural Information Processing Systems 12, Denver, USA, 1999.

U.S. Appl. No. 61/429,767, filed Jan. 5, 2011.

(56) References Cited

OTHER PUBLICATIONS

Grammalidis et al., "3-D Human Body Tracking from Depth Images Using Analysis by Synthesis", Proceedings of the IEEE International Conference on Image Processing (ICIP2001), pp. 185-188, Thessaloniki, Greece, Oct. 7-10, 2001.
International Application PCT/IL2007/000574 Search Report dated Sep. 10, 2008.
International Application PCT/IL2007/000574 Patentability Report dated Mar. 19, 2009.
Li et al., "Real-Time 3D Motion Tracking with Known Geometric Models", Real-Time Imaging Journal, vol. 5, pp. 167-187, Academic Press 1999.
Segen et al., "Shadow gestures: 3D hand pose estimation using a single camera", Proceedings of IEEE International Conference on Computer Vision and Pattern Recognition, pp. 479-485, Fort Collins, USA, Jun. 23-25, 1999.
Vogler et al., "ASL recognition based on a coupling between HMMs and 3D motion analysis", Proceedings of IEEE International Conference on Computer Vision, pp. 363-369, Mumbai, India, Jan. 4-7, 1998.
Shadmi, A., U.S. Appl. No. 12/683,452, filed Jan. 7, 2010.
Litvak et al., U.S. Appl. No. 61/308,996, filed Mar. 1, 2010.
Comaniciu et al., "Mean Shift: A Robust Approach Toward Feature Space Analysis", IEEE Transactions on Pattern Analysis and Machine Intelligence, vol. 24, No. 4, pp. 603-619, May 2002.
Datar et al., "Locality-Sensitive Hashing Scheme Based on p-Stable Distributions", Proceedings of the Symposium on Computational Geometry, pp. 253-262, Brooklyn, USA, Jun. 9-11, 2004.
Dekker, L., "Building Symbolic Information for 3D Human Body Modeling from Range Data", Proceedings of the Second International Conference on 3D Digital Imaging and Modeling, IEEE computer Society, pp. 388-397, Ottawa, Canada, Oct. 4-8, 1999.
Holte et al., "Gesture Recognition using a Range Camera", Technical Report, Laboratory of Computer Vision and Media Technology, Aalborg University, Denmark, Feb. 2007.
Cheng et al., "Articulated Human Body Pose Inference from Voxel Data Using a Kinematically Constrained Gaussian Mixture Model", CVPR EHuM2: 2nd Workshop on Evaluation of Articulated Human Motion and Pose Estimation, Jun. 2007.
Nam et al., "Recognition of Hand Gestures with 3D, Nonlinear Arm Movements", Pattern Recognition Letters, vol. 18, No. 1, pp. 105-113, Elsevier Science B.V. 1997.
Segen et al., "Human-computer interaction using gesture recognition and 3D hand tracking", ICIP 98, Proceedings of the IEEE International Conference on Image Processing, vol. 3, pp. 188-192, Chicago, USA, Oct. 4-7, 1998.
Ascension Technology Corporation, "Flock of Birds: Real-Time Motion Tracking", 2008.
Nesbat, S., "A System for Fast, Full-Text Entry for Small Electronic Devices", Proceedings of the 5th International Conference on Multimodal Interfaces, ICMI 2003, Vancouver, Canada, Nov. 5-7, 2003.
U.S. Appl. No. 12/854,187, filed Aug. 11, 2010.
U.S. Appl. No. 61/349,894, filed May 31, 2010.
U.S. Appl. No. 61/383,342, filed Sep. 16, 2010.
Gionis et al., "Similarity Search in High Dimensions via Hashing", Proceedings of the 25th Very Large Database (VLDB) Conference, Edinburgh, UK, Sep. 7-10, 1999.
Bleiweiss et al., "Markerless Motion Capture Using a Single Depth Sensor", SIGGRAPH Asia 2009, Yokohama, Japan, Dec. 16-19, 2009.
Softkinetic S.A., "3D Gesture Recognition Platform for Developers of 3D Applications", Product Datasheet, IISU™, www.softkinetic-optrima.com, Belgium, 2007-2010.
Gesturetek Inc., Consumer Electronics Solutions, "Gesture Control Solutions for Consumer Devices", www.gesturetek.com, Toronto, Ontario, Canada, 2009.
Bleiweiss et al., "Fusing Time-of-Flight Depth and Color for Real-Time Segmentation and Tracking", Editors R. Koch and A. Kolb: Dyn3D 2009, LNCS 5742, pp. 58-69, Springer-Verlag Berlin Heidelberg 2009.
Primesense Inc., "Prime Sensor™ NITE 1.1 Framework Programmer's Guide", Version 1.2, 2009.
Luxand Inc., "Luxand FaceSDK 3.0 Face Detection and Recognition Library Developer's Guide", years 2005-2010.
Intel Corporation, "Open Source Computer Vision Library Reference Manual", years 1999-2001.
Arya et al., "An Optimal Algorithm for Approximate Nearest Neighbor Searching in Fixed Dimensions", Association for Computing Machinery Journal, vol. 45, issue 6, pp. 891-923, New York, USA, Nov. 1998.
Muja et al., "Fast Approximate Nearest Neighbors with Automatic Algorithm Configuration", International Conference on Computer Vision Theory and Applications, pp. 331-340, Lisboa, Portugal, Feb. 5-8, 2009.
Mori et al., "Estimating Human Body Configurations Using Shape Context Matching", Proceedings of the European Conference on Computer Vision, vol. 3, pp. 666-680, Copenhagen, Denmark, May 27-Jun. 2, 2002.
Agarwal et al., "Monocular Human Motion Capture with a Mixture of Regressors", Proceedings of the 2004 IEEE Conference on Computer Vision and Pattern Recognition, San Diego, USA, Jun. 20-26, 2005.
Lv et al., "Single View Human Action Recognition Using Key Pose Matching and Viterbi Path Searching", Proceedings of IEEE Conference on Computer Vision and Pattern Recognition, Minneapolis, USA, Jun. 17-22, 2007.
Chinese Patent Application # 200780013930 Official Action dated Nov. 17, 2011.
Japanese Patent Application # 2009508667 Official Action dated Nov. 24, 2011.
U.S. Appl. No. 12/300,086 Official Action dated Jan. 17, 2012.
U.S. Appl. No. 61/609,386, filed Mar. 12, 2012.
Rodgers et al., "Object Pose Detection in Range Scan Data", IEEE Conference on Computer Vision and Pattern Recognition, pp. 2445-2452, New York, USA, Jun. 17-22, 2006.
Shotton et al., "Real-Time Human Pose Recognition in Parts from Single Depth Images", 24th IEEE Conference on Computer Vision and Pattern Recognition, Colorado Springs, USA, Jun. 20-25, 2011.
Jiang, H., "Human Pose Estimation Using Consistent Max-Covering", 12th IEEE International Conference on Computer Vision, Kyoto, Japan, Sep. 27-Oct. 4, 2009.
Ramanan, D., "Learning to Parse Images of Articulated Bodies", Neural Information Processing Systems Foundation year 2006.
Munoz-Salinas et al., "People Detection and Tracking Using Stereo Vision and Color", Image and Vision Computing, vol. 25, No. 6, pp. 995-1007, Jun. 1, 2007.
Bradski, G., "Computer Vision Face Tracking for Use in a Perceptual User Interface", Intel Technology Journal, vol. 2, issue 2 (2nd Quarter 2008).
Kaewtrakulpong et al., "An Improved Adaptive Background Mixture Model for Real-Time Tracking with Shadow Detection", Proceedings of the 2nd European Workshop on Advanced Video Based Surveillance Systems (AVBS'01), Kingston, UK, Sep. 2001.
Kolsch et al., "Fast 2D Hand Tracking with Flocks of Features and Multi-Cue Integration", IEEE Workshop on Real-Time Vision for Human Computer Interaction (at CVPR'04), Washington, USA, Jun. 27-Jul. 2, 2004.
Shi et al., "Good Features to Track", IEEE Conference on Computer Vision and Pattern Recognition, pp. 593-600, Seattle, USA, Jun. 21-23, 1994.
Vosselman et al., "3D Building Model Reconstruction From Point Clouds and Ground Plans", International Archives of Photogrammetry and Remote Sensing, vol. XXXIV-3/W4, pp. 37-43, Annapolis, USA, Oct. 22-24, 2001.
Submuth et al., "Ridge Based Curve and Surface Reconstruction", Eurographics Symposium on Geometry Processing, Barcelona, Spain, Jul. 4-6, 2007.

(56) References Cited

OTHER PUBLICATIONS

Fergus et al., "Object Class Recognition by Unsupervised Scale-Invariant Learning", Proceedings of the IEEE Conference on Computer Vision and Pattern Recognition, vol. 2, pp. 264-271, Jun. 18-20, 2003.

Cohen et al., "Interference of Human Postures by Classification of 3D Human Body Shape", IEEE International Workshop on Analysis and Modeling of Faces and Gestures, ICCV 2003, Nice, France, Oct. 14-17, 2003.

Agarwal et al., "3D Human Pose from Silhouettes by Relevance Vector Regression", Proceedings of the IEEE Conference on Computer Vision and Pattern Recognition, vol. 2, pp. 882-888, Jun. 27-Jul. 2, 2004.

Borenstein et al., "Combining Top-down and Bottom-up Segmentation", Proceedings of the IEEE Conference on Computer Vision and Pattern Recognition, Jun. 27-Jul. 2, 2004.

Karlinsky et al., "Combined Model for Detecting, Localizing, Interpreting and Recognizing Faces", Faces in Real-Life Images workshop, European Conference on Computer Vision, France, Oct. 12-18, 2008.

Ullman, S., "Object Recognition and Segmentation by a Fragment-Based Hierarchy", Trends in Cognitive Sciences, vol. 11, No. 2, pp. 58-64, Feb. 2007.

Shakhnarovich et al., "Fast Pose Estimation with Parameter Sensitive Hashing", Proceedings of the 9th IEEE International Conference on Computer Vision (ICCV 2003), pp. 750-759, Nice, France, Oct. 14-17, 2003.

Ramanan et al., "Training Deformable Models for Localization", Proceedings of the 2006 IEEE Conference on Computer Vision and Pattern Recognition, pp. 206-213, New York, USA, Jun. 17-22, 2006.

U.S. Appl. No. 13/229,727, filed Sep. 11, 2011.

U.S. Appl. No. 13/229,727 Office Action dated Mar. 13, 2013.

U.S. Appl. No. 12/854,187 Office Action dated Apr. 19, 2013.

Grzeszczuk et al., "Stereo based gesture recognition invariant for 3D pose and lighting", Proceedings of IEEE Conference on Computer Vision and Pattern Recognition, vol. 1, pp. 826-833, Jun. 13-15, 2000.

Li et al., "Statistical modeling of complex backgrounds for foreground object detection", IEEE Transactions on Image Processing, vol. 13, No. 11, pp. 1459-1472, Nov. 2004.

Ren et al., "Real-time modeling of 3-D soccer ball trajectories from multiple fixed cameras", IEEE Transactions on Circuits and Systems for Video Technology, vol. 18, No. 3, pp. 350-362, Mar. 2008.

\* cited by examiner

EXTRACTION OF SKELETONS FROM 3D MAPS

CROSS-REFERENCE TO RELATED APPLICATION

This application claims the benefit of U.S. Provisional Patent Application 61/233,502, filed Aug. 13, 2009, which is incorporated herein by reference.

FIELD OF THE INVENTION

The present invention relates generally to methods and systems for three-dimensional (3D) mapping, and specifically to processing of 3D map data.

BACKGROUND OF THE INVENTION

A number of different methods and systems are known in the art for creating depth maps. In the present patent, application and in the claims, the term "depth map" refers a representation of a scene as a two-dimensional matrix of pixels, in which each pixel corresponds to a respective location in the scene and has a respective pixel depth value, indicative of the distance from a certain reference location to the respective scene location. (In other words, the depth map has the form of an image in which the pixel values indicate topographical information, rather than brightness and/or color of the objects in the scene.) Depth maps may be created, for example, by detection and processing of an image of an object onto which a laser speckle pattern is projected, as described in PCT International Publication WO 2007/043036 A1, whose disclosure is incorporated herein by reference.

Depth maps may be processed in order to segment and identify objects in the scene. Identification of humanoid forms (meaning 3D shapes whose structure resembles that of a human being) in a depth map, and changes in these forms from scene to scene, may be used as a means for controlling computer applications. For example, PCT International Publication WO 2007/132451, whose disclosure is incorporated herein by reference, describes a computer-implemented method in which a depth map is segmented so as to find a contour of a humanoid body. The contour is processed in order to identify a torso and one or more limbs of the body. An input is generated to control an application program running on a computer by analyzing a disposition of at least one of the identified limbs in the depth map.

SUMMARY OF THE INVENTION

Embodiments of the present invention provide methods, devices and software for extracting information from depth maps.

There is therefore provided, in accordance with an embodiment of the present invention, a method for processing data, including receiving a temporal sequence of depth maps of a scene containing a humanoid form having a head, the depth maps including a matrix of pixels having respective pixel depth values. Using a digital processor, at least one of the depth maps are processed so as to find a location of the head. Dimensions of the humanoid form are estimated based on the location, and movements of the humanoid form are tracked over the sequence using the estimated dimensions.

In some embodiments, estimating the dimension includes extracting a height of the humanoid form from the at least one of the depth maps based on the location of the head. Extracting the height may include locating a foot of the humanoid form in the at least one of the depth maps, and measuring a distance from the head to the foot. Alternatively, extracting the height includes processing the at least one of the depth maps so as to identify a planar surface corresponding to a floor on which the humanoid form is standing, and measuring a distance from the head to the planar surface.

In disclosed embodiments, processing the at least one of the depth maps includes identifying left and right arms of the humanoid form, and searching to find the head between the arms. In one embodiment, identifying the left and right arms includes capturing the at least of the depth maps while the humanoid form stands in a calibration pose, in which the left and right arms are raised. Typically, the left and right arms are raised above a shoulder level of the humanoid form in the calibration pose.

Additionally or alternatively, identifying the left and right arms includes extracting edges of the humanoid form from the at least one depth map, finding three-dimensional (3D) medial axes and extreme points of limbs of the humanoid form based on the edges, and identifying joints in the limbs based on the medial axes. Typically, identifying the joints includes locating left and right shoulders of the humanoid form, and estimating the dimensions includes extracting a height of the humanoid form from the at least one of the depth maps based on the location of the head, and computing a width between the shoulders, and estimating the dimensions of other parts of the humanoid form using the height and the width.

In an alternative embodiment, the method includes capturing one or more two-dimensional (2D) images of the humanoid form, and detecting a face of the humanoid form in the 2D images, wherein processing the at least one of the depth maps includes registering the depth maps with the 2D images, and finding the location of the head using the detected face.

The method may include refining the estimated dimension responsively to the depth maps in the sequence while tracking the movements.

There is also provided, in accordance with an embodiment of the present invention, apparatus for processing data, including an imaging assembly, which is configured to capture a temporal sequence of depth maps of a scene containing a humanoid form having a head, the depth maps including a matrix of pixels having respective pixel depth values. A processor is configured to process at least one of the depth maps so as to find a location of the head, to estimate dimensions of the humanoid form based on the location, and to track movements of the humanoid form over the sequence using the estimated dimensions.

There is additionally provided, in accordance with an embodiment of the present invention, a computer software product, including a computer-readable medium in which program instructions are stored, which instructions, when read by a computer, cause the computer to receive a temporal sequence of depth maps of a scene containing a humanoid form having a head, the depth maps including a matrix of pixels having respective pixel depth values, to process at least one of the depth maps so as to find a location of the head, to estimate dimensions of the humanoid form based on the location, and to track movements of the humanoid form over the sequence using the estimated dimensions.

The present invention will be more fully understood from the following detailed description of the embodiments thereof, taken together with the drawings in which:

DETAILED DESCRIPTION OF EMBODIMENTS

Overview

Depth maps provide a wealth of information, particularly when they are presented in a continuous stream over time. Games and other applications based on depth maps, however, have developed only slowly due to the difficulties inherent in capturing, processing, and extracting high-level information from such maps. Finding and tracking the parts of a moving humanoid form in a sequence of depth maps is a particular challenge.

Embodiments of the present invention that are described hereinbelow provide robust, efficient methods, systems and software for extracting humanoid forms from depth maps. These methods are directed particularly at reconstructing a "skeleton" of a 3D form that is believed to correspond to a humanoid body, i.e., a schematic model that includes the torso, head and limbs and indicates their respective locations and orientations. The parameters and motion of such a skeleton can serve as a simplified input to application programs, enabling such programs to respond to users' gestures and posture.

In the embodiments disclosed below, a processor receives a temporal sequence of depth maps of a scene containing a humanoid form. The processor finds the location of the head of the humanoid form in at least one of the depth maps, and estimates the dimensions of the humanoid form based on the head location. The processor uses the head location and estimated dimensions in reconstructing the skeleton and thus tracking movements of the humanoid form over the sequence of depth maps.

A number of different techniques may be used to find the head location initially. In some embodiments, the processor segments and analyzes a 3D form to identify right and left arms, and then searches the space between the arms in order to find the head. This task can be facilitated by instructing the user (whose body corresponds to the 3D form in the depth maps) to assume a suitable calibration pose, typically a pose in which the hands are raised to both sides of the head.

In an alternative embodiment, the depth maps are registered with 2D images (such as color images) of the same scene. The processor may apply a face recognition technique to identify the face of a humanoid form in a 2D image. The face location in the 2D image indicates the location of the head of the 3D form.

System Description

Figure 1:
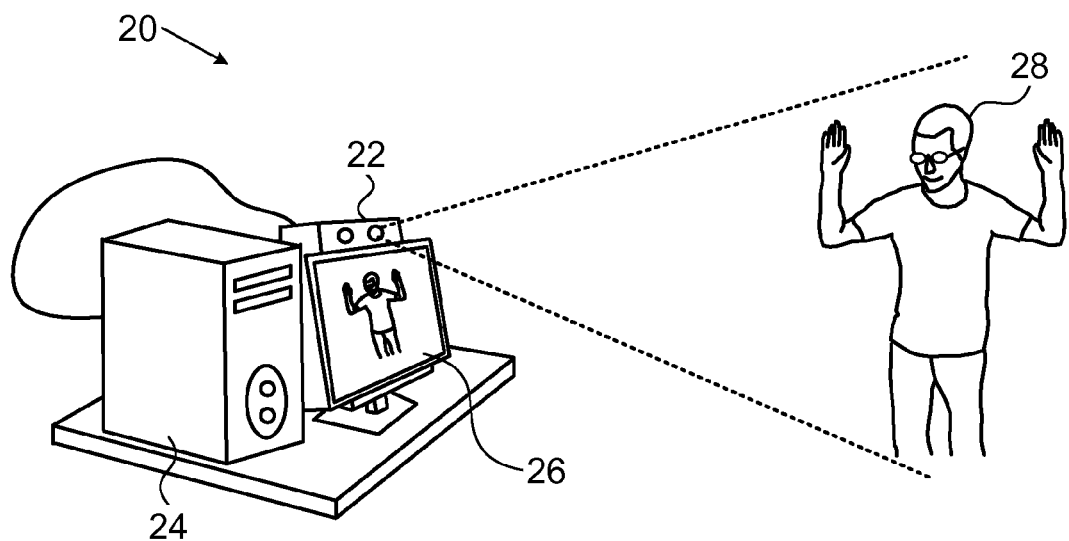
FIG. 1 is a schematic, pictorial illustration of a system for 3D mapping and tracking of humanoid forms, in accordance with an embodiment of the present invention.

FIG. 1 is a schematic, pictorial illustration of a 3D user interface system 20, in accordance with an embodiment of the present invention. The user interface is based on a 3D imaging assembly 22, which captures 3D scene information that includes at least a part of the body of a human user 28. Assembly 22 may also capture 2D color video images of the scene. Details of a 3D imaging assembly of this sort are described, for example, in PCT International Publication WO 2010/004542, whose disclosure is incorporated herein by reference.

Assembly 22 outputs a sequence of frames containing 3D map data (and possibly color image data, as well) to a computer 24, which extracts high-level information from the map data. This high-level information is provided via an Application Program Interface (API) to an application running on computer 24, which drives a display screen 26 accordingly. For example, user 28 may interact with game software running on computer 24 by moving his limbs and changing his body posture.

In one embodiment, assembly 22 projects a pattern of spots onto the scene and captures an image of the projected pattern. Assembly 22 or computer 24 then computes the 3D coordinates of points in the scene (including points on the surface of the user's body) by triangulation, based on transverse shifts of the spots in the pattern. This approach is advantageous in that it does not require the user to hold or wear any sort of beacon, sensor, or other marker. It gives the depth coordinates of points in the scene relative to a predetermined reference plane, at a certain distance from assembly 22. Methods and devices for this sort of triangulation-based 3D mapping using a projected pattern are described, for example, in PCT International Publications WO 2007/043036, WO 2007/105205 and WO 2008/120217, whose disclosures are incorporated herein by reference, as well as in the above-mentioned WO 2010/004542.

Alternatively, system 20 may use other methods of 3D mapping, such as stereoscopic imaging or time-of-flight measurements, based on single or multiple cameras or other types of sensors, as are known in the art.

In the embodiment shown in FIG. 1, system 20 captures and processes a temporal sequence of depth maps (also referred to as 3D maps) containing user 28, while the user moves his body. Software running on a processor in assembly 22 and/or computer 24 processes the 3D map data to extract geometrical features of the humanoid forms corresponding to the users in the scene. The software analyzes these geometrical features (as described in detail hereinbelow) in order to extract a skeleton of each form, including 3D locations and orientations of the users' hands and joints. It may also analyze the trajectory of the hands over multiple frames in the sequence in order to identify gestures delineated by the hands. The skeleton and gesture information are provided via the above-mentioned API to an application program running on computer 24. This program may, for example, move and modify images presented on display 26 in response to the skeleton and/or gesture information.

Computer 24 typically comprises a general-purpose computer processor, which is programmed in software to carry out the functions described hereinbelow. The software may be downloaded to the processor in electronic form, over a network, for example, or it may alternatively be provided on tangible, non-transitory media, such as optical, magnetic, or electronic memory media. Alternatively or additionally, some or all of the described functions of the computer may be implemented in dedicated hardware, such as a custom or semi-custom integrated circuit or a programmable digital signal processor (DSP). Although computer 24 is shown in FIG. 1, by way of example, as a separate unit from imaging assembly 22, some or all of the processing functions of the computer may be performed by a suitable microprocessor and software or by dedicated circuitry within the housing of the imaging assembly or otherwise associated with the imaging assembly.

As another alternative, at least some of these processing functions may be carried out by a suitable processor that is integrated with display screen 26 (in a television set, for example) or with any other suitable sort of computerized device, such as a game console or media player. The sensing functions of assembly 22 may likewise be integrated into the computer or other computerized apparatus that is to be controlled by the sensor output.

Figure 2:
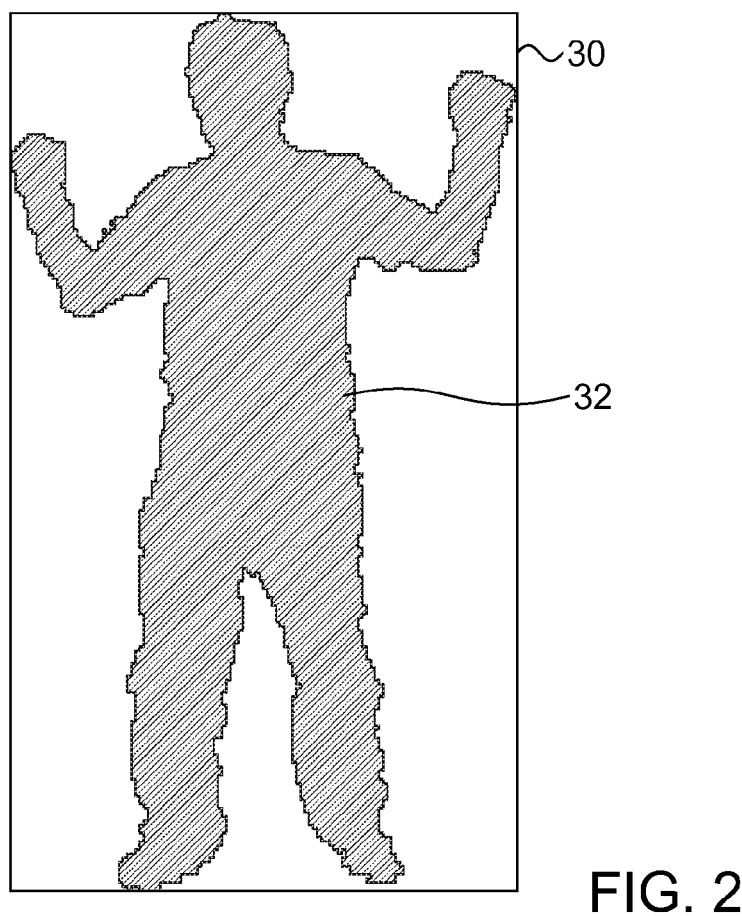
FIG. 2 is a schematic representation of a depth map, in accordance with an embodiment of the present invention.

FIG. 2 is a schematic representation of a depth map captured by assembly 22, in accordance with an embodiment of the present invention. The depth map, as explained above, comprises a matrix of pixels having respective depth values. Computer 24 processes these depth values in order to identify and segment a component of the image (i.e., a group of neighboring pixels) having characteristics of a humanoid form (such as overall size, shape and motion from frame to frame of the sequence of depth maps). Methods for identification and segmentation of such forms in sequences of depth maps are described, for example, in U.S. patent application Ser. No. 12/854,187, entitled "Analysis of Three-Dimensional Scenes", which is assigned to the assignee of the present patent application and whose disclosure is incorporated herein by reference. In map 30, the humanoid form is standing in a calibration pose, in which the left and right arms are raised, as explained further hereinbelow.

Methods for Skeleton Extraction

Figure 3:
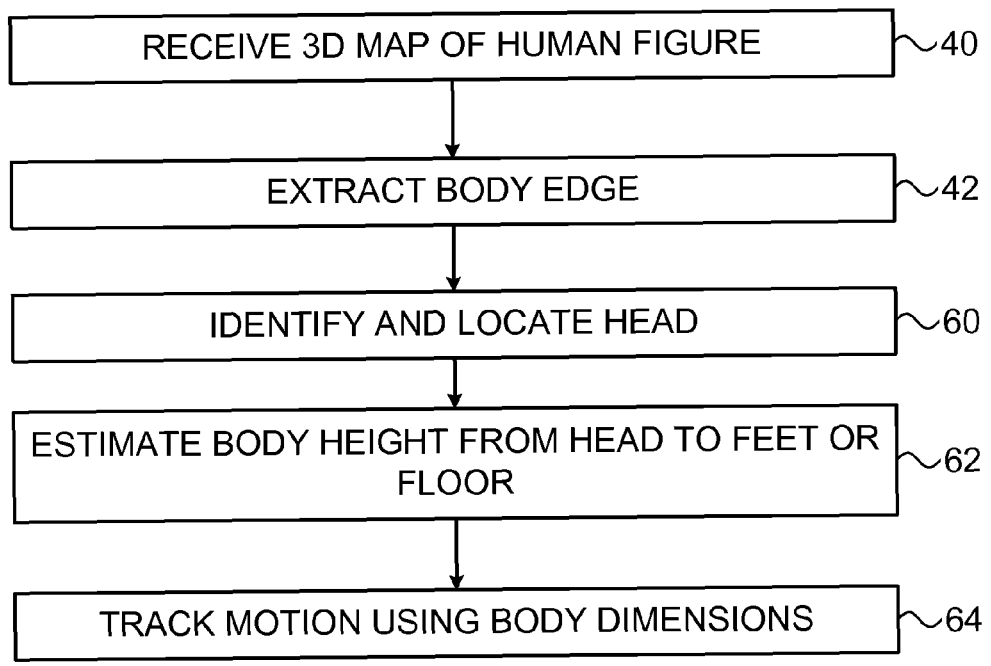
FIG. 3 is a flow chart that schematically illustrates a method for extracting and tracking features of humanoid forms in a depth map, in accordance with an embodiment of the present invention.

FIG. 3 is a flow chart that schematically illustrates a method for extracting and tracking features of a humanoid form in a sequence of depth maps, in accordance with an embodiment of the present invention. Computer 24 applies this method upon receiving a depth map, at a map input step 40. The map is assumed to have been segmented so as to identify one or more 3D connected components that may be humanoid forms, as shown in FIG. 2, for example. Computer 24 processes the depth map in order to find the edge of the connected component, at an edge extraction 42. Various methods that are known in the art may be used for this purpose. For example, the computer may take a derivative of the depth map and then connect together neighboring pixels having similar derivative values until a complete edge has been defined. The above-mentioned WO 2007/132451 also describes methods that may be used in this context.

Figure 4:
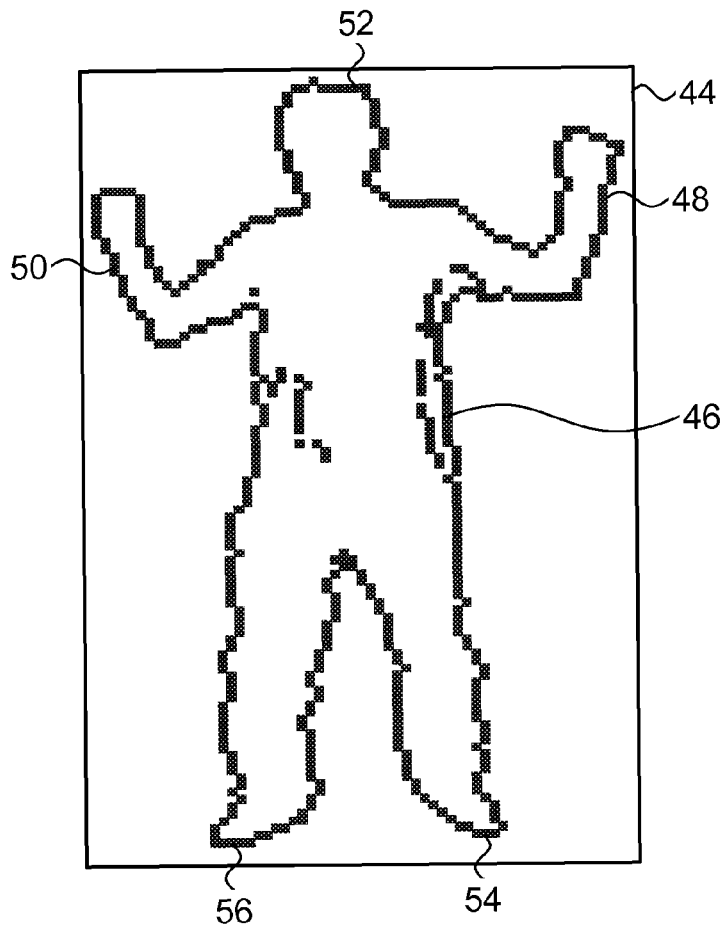
FIG. 4 is a schematic representation of the edge of a humanoid form extracted from a depth map, in accordance with an embodiment of the present invention.

FIG. 4 is a schematic representation of a processed depth map 44, showing an extracted edge 46 of the humanoid form of FIG. 2, in accordance with an embodiment of the present invention. Because the human subject is standing in the calibration pose, computer 24 can clearly identify the body extremities, including arms 48 and 50, head 52, and feet 54. One method that can be used for this purpose is described hereinbelow with reference to FIGS. 5 and 6. Although FIG. 4 (and similarly FIGS. 2 and 6) is shown as a two-dimensional image due to the limitations of the printed page, edge 46 is actually a 3D form, and operations on this edge, as described below, are performed in three dimensions.

Figure 5:
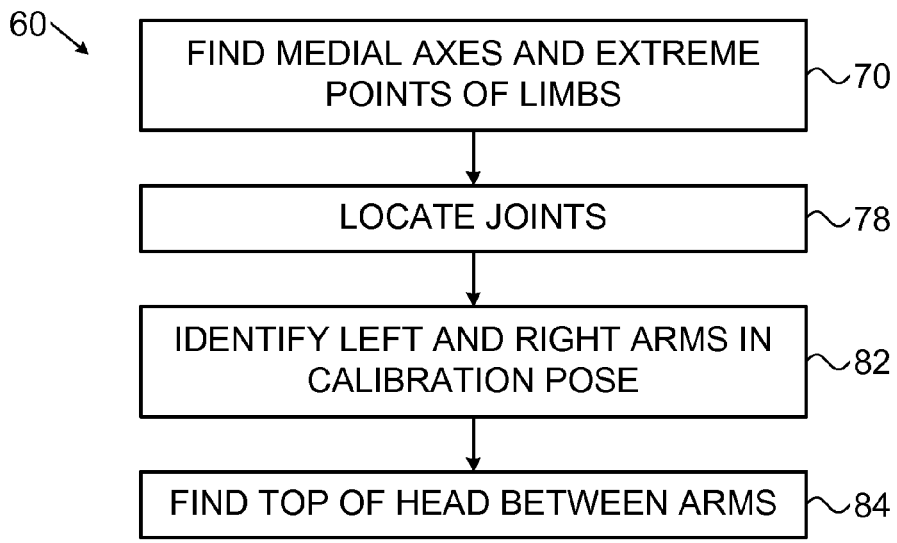
FIG. 5 is a flow chart that schematically illustrates a method for finding features of a humanoid form in a depth map, in accordance with an embodiment of the present invention.

Returning to FIG. 3, computer 24 processes the extracted body edge in order to identify head 52, at a head location step 60. One challenge in this step is to differentiate the head from other body extremities, notwithstanding differences in height, head size (including hair) and other body dimensions among users of system 20. Because of these factors, as well as variations in pose, lighting, and clutter in the area of the user's body, the input to step 60 is often not as clear as the exemplary map shown in FIG. 4. One method that may be used to overcome the difficulties of head location and skeleton extraction is shown in FIG. 5.

Another method that may be used at step 60 is based on locating the face of the humanoid form. A number of methods have been developed for locating and identifying facial features in digital images. Image processing software that may be used for this purpose is available, for example, in the FaceSDK package, available from Luxand Inc. (Alexandria, Va.), as well as in the OpenCV computer vision library available from Intel Corp. (Santa Clara, Calif.). Assuming that assembly 22 outputs 2D images in registration with the depth maps (as described in the above-mentioned WO 2010/004542), the face recognition software may operate on a 2D image to identify and find the coordinates of a face within a humanoid form that was received at step 40. Computer 24 may then use these coordinates at step 60 in locating the head that is within the body edge.

Computer 24 uses the head location found at step 60 in estimating the body height of the humanoid form, at a height estimation step 62. Needless to say, height varies substantially among computer users, from small children to tall adults. Other body dimensions (such as lengths of limbs) tend to scale with the height. Therefore, for reliable skeleton extraction and tracking of user movement, it is helpful to have an accurate estimate of the height. In cases in which feet 54 and 56 can be identified, such as that shown in FIG. 4, the height can be estimated by taking the distance from head 52 to the feet.

On the other hand, it commonly occurs that the feet of the humanoid subject are obscured by other objects in the scene or are outside the frame of the depth map entirely. In such cases, rather than locating the feet, computer 24 may locate the floor in the scene. The floor can be identified as a planar, generally horizontal surface (depending on the orientation of assembly 22) in the lower portion of the depth map. A detailed method for locating the floor in a depth map is presented, for example, in the above-mentioned U.S. patent application Ser. No. 12/854,187. Once the floor plane has been found, the height of the humanoid form is given by the distance from the head to this plane.

Computer 24 uses the body height in estimating the remaining body dimensions for purposes of pose extraction and motion tracking, at a tracking step 64. The relevant dimensions (such as lengths of arms, legs and torso) may be derived from the height using anthropometric standards for average body build. The computer may additionally process the depth map to locate the shoulders and/or other features of the skeleton, which give an indication of the body proportions (height/width), and may use these proportions in more accurately estimating the remaining body dimensions. (In difficult conditions, in which the head cannot be clearly identified, the body height, as well as width, may be estimated on the basis of the shoulders alone.) The estimated body dimensions may be combined with actual measurements of arm and leg dimensions (length and thickness) made on the depth map for still more accurate modeling.

The result of step 64 is a skeleton with well-defined dimensions. The skeleton includes torso, head, arms and legs, with joints, extreme points, and body part dimensions identified. The accurate, known dimensions of the skeleton facilitate reliable, robust tracking of motion of human subjects, even when the subjects turn their bodies and assume postures in which parts of their bodies are obscured from assembly 22. Computer 24 can model the motion of a human subject in terms of rotation and translation of the joints and extreme points of the skeleton. This information can be provided to application programs via an API, as described, for example, in U.S. Provisional Patent Application 61/349,894, filed May 31, 2010, which is assigned to the assignee of the present patent application and whose disclosure is incorporated herein by reference.

The process of estimating skeleton dimensions that is described above may continue as the user interacts with the computer, with gradual refinement and improvement of the estimates. For this purpose, computer 24 may gather further information from the depth maps in the ongoing sequence, including maps of different poses in which certain parts of the body may be mapped more accurately. The computer combines this information over multiple frames in order to generate a more accurate set of measurements of the body parts and thus improve the skeleton model.

Figure 6:
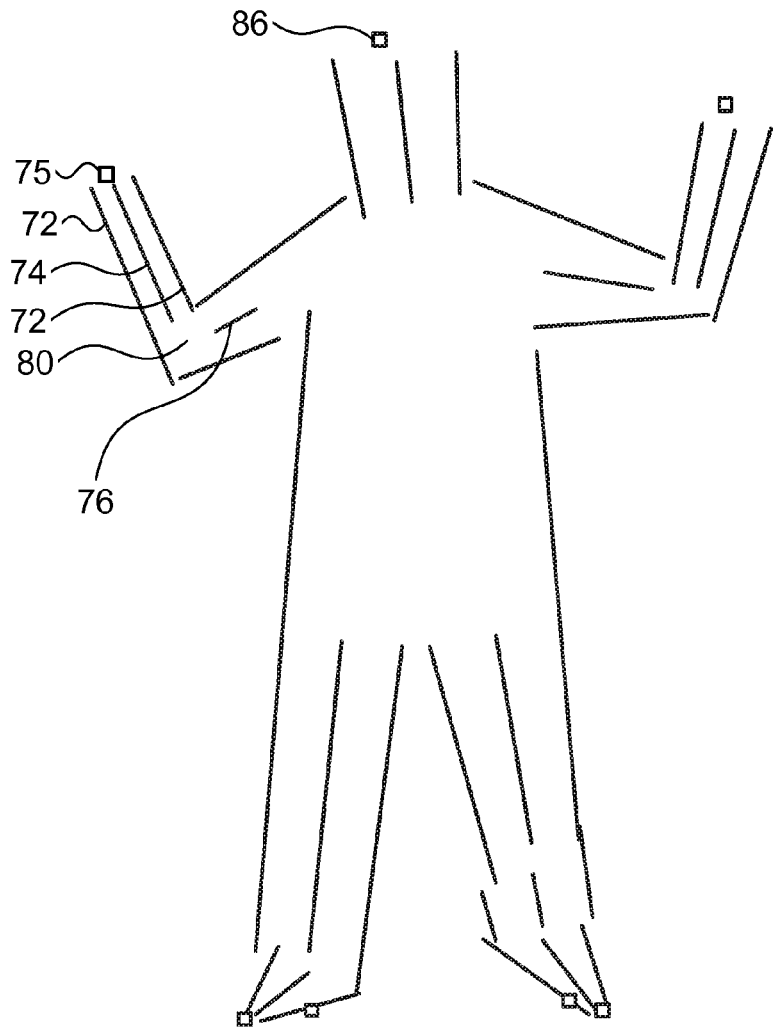
FIG. 6 is a schematic representation of features of a humanoid form that have been extracted from a depth map, in accordance with an embodiment of the present invention.

Reference is now made to FIGS. 5 and 6, which schematically show details of a method that may be used at step 60 (FIG. 3) to find the location of the head and other features of a humanoid form in a depth map, in accordance with an embodiment of the present invention. FIG. 5 is a flow chart, while FIG. 6 is a schematic representation of features of a humanoid form that have been extracted from the depth map illustrated in FIGS. 2 and 4.

Computer 24 processes edge 46 in order to find the medial axes and extreme points of the limbs of the humanoid form, at a limb analysis step 70. Various different techniques may be used for this purpose. In the example illustrated in FIG. 6, computer 24 identifies the body parts by fitting straight lines to the edges shown in FIG. 4. The edge points may be grouped for fitting in such a way that the lines that are fitted to neighboring groups of edge points meet at sharp angles, as shown in FIG. 6. The computer then groups these straight lines in matching pairs of approximately parallel lines, such as lines 72. In this case, the computer will identify lines 72 as defining the right forearm, on the basis of their length, separation, and location relative to the rest of the body. The other parts of the limbs are identified in a similar manner.

For each such pair of lines, computer 24 identifies a medial axis 74, 76, along with an extreme point 75 as appropriate. As noted earlier, the medial axes and extreme points are represented in 3D coordinates. The computer finds the approximate intersection points of the medial axes in order to identify body joints, at a joint location step 78. (The medial axes may not precisely intersect in 3D space.) Thus, the computer locates a joint 80 (in this case, the right elbow) of the subject as the intersection between axes 74 and 76 of the forearm and upper arm, respectively.

To extract the skeleton, computer 24 identifies the limbs that correspond to the subject's left and right arms, at an arm identification step 82. The computer selects arm candidates from among the pairs of parallel lines that were found at step 70. The choice of candidates is based on identification of the lower arms (defined by edges 72 and axis 74), together with the corresponding elbow locations and possibly other factors, such as the straight lines corresponding to the outer part of the upper arms. The computer seeks a pair of arm candidates on opposite sides of the humanoid form, with similar proportions and at a similar height. If the subject is standing in the calibration pose, as illustrated in the foregoing figures, then the search for the arm candidates may be limited to limbs whose medial axes fall within a certain predefined angular range. For example, the upper arm directions may be restricted to fall within the range between −60° and +20° of the horizontal.

After identifying the arms, computer 24 calculates the shoulder location for each arm in the calibration pose, based on the respective location of elbow 80, the direction of upper arm axis 76, and the estimated upper arm length. The computer then calculates the shoulder width by taking the distance between the shoulder locations. (The computer may also estimate the widths of the limbs, such as the respective widths of the upper and lower arms.) The computer searches the space above and between the shoulders in order to find the head of the humanoid form, at a head finding step 84. The computer may find a top point 86 of the head, for example, by searching for the highest point on edge 46 in the region of the depth map that is between the forearms and above the elbows.

As explained earlier, computer 24 uses the location of top point 86 at step 62 (FIG. 3) in finding the body height. The computer then applies this height, possibly together with the distance between the shoulders, is estimating the body dimensions and tracking motion of the body at step 64.

The dimensions of the humanoid form may be used immediately in tracking the movements of the body of a user or, alternatively or additionally, they may be stored and applied subsequently without necessarily repeating the procedure. For example, computer 24 may store dimensions associated with a given user name and then recall those dimensions when that user logs in. For this reason, the sequence of depth maps over which embodiments of the present invention are applied is not necessarily a continuous sequence. Rather, the term "sequence of depth maps," as used in the context of the present patent application and in the claims, should be understood as referring to any succession of depth maps, whether continuous or broken into two or more separate sub-sequences, in which a particular humanoid form appears.

Although embodiments of the present invention are described above, for the sake of clarity, in the context of the particular components of system 20, the principles of the present invention may similarly be applied in conjunction with substantially any other type of depth mapping system. Furthermore, although the described embodiments are implemented using certain specific image processing algorithms, the principles of these embodiments may likewise be implemented using other image processing techniques, as are known in the art. All such alternative implementations are considered to be within the scope of the present invention.

It will thus be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method for processing data, comprising:
   receiving a temporal sequence of depth maps of a scene containing a humanoid form having a head, the depth maps comprising a matrix of pixels having respective pixel depth values;
   using a digital processor, processing at least one of the depth maps so as to find a location of the head and so as to identify a planar surface corresponding to a floor on which the humanoid form is standing;
   extracting a height of the humanoid form from the at least one of the depth maps by measuring a distance from the head to the planar surface;
   estimating dimensions of the humanoid form based on the height; and
   tracking movements of the humanoid form over the sequence using the estimated dimensions.

2. The method according to claim 1, wherein extracting the height comprises locating a foot of the humanoid form in the at least one of the depth maps, and measuring a distance from the head to the foot.

3. The method according to claim 1, wherein processing the at least one of the depth maps comprises identifying left and right arms of the humanoid form, and searching to find the head between the arms.

4. The method according to claim 3, wherein identifying the left and right arms comprises capturing the at least of the depth maps while the humanoid form stands in a calibration pose, in which the left and right arms are raised.

5. The method according to claim 4, wherein the left and right arms are raised above a shoulder level of the humanoid form in the calibration pose.

6. The method according to claim 3, wherein identifying the left and right arms comprises extracting edges of the humanoid form from the at least one depth map, finding three-dimensional (3D) medial axes and extreme points of limbs of the humanoid form based on the edges, and identifying joints in the limbs based on the medial axes.

7. The method according to claim 6, wherein identifying the joints comprises locating left and right shoulders of the humanoid form, and wherein estimating the dimensions comprises extracting a height of the humanoid form from the at least one of the depth maps based on the location of the head, and computing a width between the shoulders, and estimating the dimensions of other parts of the humanoid form using the height and the width.

8. A method for processing data, comprising:
receiving a temporal sequence of depth maps of a scene containing a humanoid form having a head, the depth maps comprising a matrix of pixels having respective pixel depth values;
capturing one or more two-dimensional (2D) images of the humanoid form;
using a digital processor, detecting a face of the humanoid form in the 2D images;
processing the at least one of the depth maps by registering the depth maps with the 2D images, and finding the location of the head in the at least one of the depth maps using the detected face;
estimating dimensions of the humanoid form based on the location of the head; and
tracking movements of the humanoid form over the sequence using the estimated dimensions.

9. The method according to claim 1, and comprising refining the estimated dimension responsively to the depth maps in the sequence while tracking the movements.

10. Apparatus for processing data, comprising:
an imaging assembly, which is configured to capture a temporal sequence of depth maps of a scene containing a humanoid form having a head, the depth maps comprising a matrix of pixels having respective pixel depth values; and
a processor, which is configured to process at least one of the depth maps so as to find a location of the head and to identify a planar surface corresponding to a floor on which the humanoid form is standing, to extract a height of the humanoid form from the at least one of the depth maps by measuring a distance from the head to the planar surface, to estimate dimensions of the humanoid form based on the height, and to track movements of the humanoid form over the sequence using the estimated dimensions.

11. The apparatus according to claim 10, wherein the processor is configured to extract the height by locating a foot of the humanoid form in the at least one of the depth maps, and measuring a distance from the head to the foot.

12. The apparatus according to claim 10, wherein the processor is configured to identify left and right arms of the humanoid form in the at least one of the depth maps and to find the head by searching between the arms.

13. The apparatus according to claim 12, wherein the at least of the depth maps is captured while the humanoid form stands in a calibration pose, in which the left and right arms are raised.

14. The apparatus according to claim 13, wherein the left and right arms are raised above a shoulder level of the humanoid form in the calibration pose.

15. The apparatus according to claim 12, wherein the processor is configured to identify the left and right arms by extracting edges of the humanoid form from the at least one depth map, finding three-dimensional (3D) medial axes and extreme points of limbs of the humanoid form based on the edges, and identifying joints in the limbs based on the medial axes.

16. The apparatus according to claim 15, wherein the joints identified by the processor comprise left and right shoulders of the humanoid form, and wherein the processor is configured to extract a height of the humanoid form from the at least one of the depth maps based on the location of the head, to compute a width between the shoulders, and to estimate the dimensions of other parts of the humanoid form using the height and the width.

17. The apparatus according to claim 10, wherein the imaging assembly is configured to capture one or more two-dimensional (2D) images of the humanoid form, and wherein the processor is configured to detect a face of the humanoid form in the 2D images, to register the depth maps with the 2D images, and to find the location of the head using the detected face.

18. The apparatus according to claim 10, wherein the processor is configured to refine the estimated dimension responsively to the depth maps in the sequence while tracking the movements.

19. A computer software product, comprising a non-transitory computer-readable medium in which program instructions are stored, which instructions, when read by a computer, cause the computer to receive a temporal sequence of depth maps of a scene containing a humanoid form having a head, the depth maps comprising a matrix of pixels having respective pixel depth values, to process at least one of the depth maps so as to find a location of the head and to identify a planar surface corresponding to a floor on which the humanoid form is standing, to extract a height of the humanoid form from the at least one of the depth maps by measuring a distance from the head to the planar surface, to estimate dimensions of the humanoid form based on the height, and to track movements of the humanoid form over the sequence using the estimated dimensions.

20. The product according to claim 19, wherein the instructions cause the computer to extract the height by locating a foot of the humanoid form in the at least one of the depth maps, and measuring a distance from the head to the foot.

21. The product according to claim 19, wherein the instructions cause the computer to identify left and right arms of the humanoid form in the at least one of the depth maps and to find the head by searching between the arms.

22. The product according to claim 21, wherein the at least of the depth maps is captured while the humanoid form stands in a calibration pose, in which the left and right arms are raised.

23. The product according to claim 22, wherein the left and right arms are raised above a shoulder level of the humanoid form in the calibration pose.

24. The product according to claim 21, wherein the instructions cause the computer to identify the left and right arms by extracting edges of the humanoid form from the at least one depth map, finding three-dimensional (3D) medial axes and extreme points of limbs of the humanoid form based on the edges, and identifying joints in the limbs based on the medial axes.

25. The product according to claim 24, wherein the joints identified by the computer comprise left and right shoulders of the humanoid form, and wherein the instructions cause the computer to extract a height of the humanoid form from the at least one of the depth maps based on the location of the head, to compute a width between the shoulders, and to estimate the dimensions of other parts of the humanoid form using the height and the width.

26. The product according to claim 19, wherein the instructions cause the computer to receive one or more two-dimensional (2D) images of the humanoid form, to detect a face of the humanoid form in the 2D images, to register the depth maps with the 2D images, and to find the location of the head using the detected face.

27. The product according to claim 19, wherein the instructions cause the computer to refine the estimated dimension responsively to the depth maps in the sequence while tracking the movements.

* * * * *